United States Patent
Finkeldei et al.

(10) Patent No.: US 9,440,208 B2
(45) Date of Patent: Sep. 13, 2016

(54) REACTOR AND PROCESS FOR PREPARING HYDROGEN SULPHIDE

(71) Applicants: Caspar-Heinrich Finkeldei, Alzenau (DE); Chiu Kee Cheung, Alzenau (DE); Ralf Maassen, Erftstadt (DE); Stefan Wenner, Frankfurt (DE); Martin Koerfer, Kahl (DE)

(72) Inventors: Caspar-Heinrich Finkeldei, Alzenau (DE); Chiu Kee Cheung, Alzenau (DE); Ralf Maassen, Erftstadt (DE); Stefan Wenner, Frankfurt (DE); Martin Koerfer, Kahl (DE)

(73) Assignee: EVONIK DEGUSSA GmbH, Essen (DE)

( * ) Notice: Subject to any disclaimer, the term of this patent is extended or adjusted under 35 U.S.C. 154(b) by 0 days.

(21) Appl. No.: 14/410,360

(22) PCT Filed: May 31, 2013

(86) PCT No.: PCT/EP2013/061244
§ 371 (c)(1),
(2) Date: Dec. 22, 2014

(87) PCT Pub. No.: WO2013/189719
PCT Pub. Date: Dec. 27, 2013

(65) Prior Publication Data
US 2015/0209747 A1    Jul. 30, 2015

(30) Foreign Application Priority Data

Jun. 22, 2012 (EP) .................................... 12173167

(51) Int. Cl.
| | | |
|---|---|---|
| *C01B 17/16* | (2006.01) |
| *B01J 10/00* | (2006.01) |
| *B01J 8/02* | (2006.01) |
| *B01J 8/06* | (2006.01) |
| *B01J 19/00* | (2006.01) |
| *B01J 19/24* | (2006.01) |

(52) U.S. Cl.
CPC .................. *B01J 8/0285* (2013.01); *B01J 8/02* (2013.01); *B01J 8/067* (2013.01); *B01J 10/005* (2013.01); *B01J 19/006* (2013.01); *B01J 19/24* (2013.01); *C01B 17/162* (2013.01); *B01J 2208/00327* (2013.01); *B01J 2208/027* (2013.01); *B01J 2219/00166* (2013.01); *B01J 2219/00777* (2013.01)

(58) Field of Classification Search
CPC .... C01B 17/161; C01B 17/162; B01J 10/00; B01J 12/00; B01J 10/005; B01J 12/007
See application file for complete search history.

(56) References Cited

U.S. PATENT DOCUMENTS

| | | | |
|---|---|---|---|
| 2,876,071 A | | 3/1959 | Updegraff |
| 2,965,455 A | * | 12/1960 | Maude .................. C01B 17/162 422/160 |
| 3,087,788 A | * | 4/1963 | Porter ................... C01B 17/161 423/443 |
| 2005/0265913 A1 | | 12/2005 | Moller et al. |
| 2010/0015037 A1 | | 1/2010 | Redlingshoefer et al. |
| 2010/0068128 A1 | * | 3/2010 | Wolfert .................... B01J 8/008 423/564 |

FOREIGN PATENT DOCUMENTS

| | | |
|---|---|---|
| DE | 10 2008 040 544 A1 | 1/2010 |
| EP | 2 125 612 B1 | 3/2011 |
| GB | 1 193 040 A | 5/1970 |
| WO | 2004/028963 A1 | 4/2004 |

OTHER PUBLICATIONS

International Search Report and Written Opinion issued Nov. 6, 2013 in PCT/EP2013/061244 filed May 31, 2013.
European Search Report issued Nov. 26, 2012 in Patent Application No. EP 12173167.3 filed Jun. 22, 2012.

* cited by examiner

*Primary Examiner* — Timothy Vanoy
(74) *Attorney, Agent, or Firm* — Oblon, McClelland, Maier & Neustadt, L.L.P.

(57) ABSTRACT

The present invention relates to a reactor and to a process for synthesis of hydrogen sulphide from elemental sulphur and hydrogen at elevated pressure and elevated temperature. The invention further relates to the use of the reactor for preparation of hydrogen sulphide in high yield and with a low $H_2S_X$ content.

20 Claims, 3 Drawing Sheets

REACTOR AND PROCESS FOR PREPARING HYDROGEN SULPHIDE

The present invention relates to a reactor and to a process for synthesis of hydrogen sulphide from elemental sulphur and hydrogen at elevated pressure and elevated temperature. The invention further relates to the use of the reactor for preparation of hydrogen sulphide in high yield and with a low $H_2S_X$ content.

Hydrogen sulphide is an industrially important intermediate, for example for the synthesis of methyl mercaptan, dimethyl sulphide, dimethyl disulphide, sulphonic acids, dimethyl sulphoxide, dimethyl sulphone, and for numerous sulphidation reactions. It is nowadays obtained predominantly from mineral oil and natural gas processing, and by reaction of sulphur and hydrogen.

Hydrogen sulphide is prepared from the elements typically by introduction of gaseous hydrogen into a sulphur melt, by converting sulphur to the gas phase and converting it therein in an exothermic reaction with hydrogen to hydrogen sulphide (Ullmann's Encyclopedia of Industrial Chemistry, Sixth Edition, 1998, Wiley-VCH).

In order to achieve a satisfactory reaction rate and a high hydrogen sulphide yield, the reaction has to take place at elevated temperature relative to standard conditions. According to the further use intended, it may be necessary to provide the hydrogen sulphide prepared at a pressure of >5 bar. In this case, it would be advantageous to perform the hydrogen sulphide synthesis directly at the pressure required. This entails a further temperature increase in order to ensure that sufficient sulphur is converted to the gas phase. However, the performance of the hydrogen sulphide synthesis at a temperature of >450° C. has the disadvantage that hydrogen sulphide causes corrosion damage to the reactor material under these conditions. There is accordingly a requirement for a reactor construction which enables high conversion rates and simultaneously avoids damage, at least to the pressure-bearing elements of the reactor.

One approach to enhancing the hydrogen sulphide yield is to increase the residence time of the hydrogen gas in the sulphur melt. This is done, for example, in U.S. Pat. No. 2,876,070 and DE 10 2008 040 544 A1 by use of reactors having gas collecting regions in the form of intermediate trays or cups arranged within the sulphur melt. However, this type of construction achieves a conversion of hydrogen of only >96%. Increasing the number of gas collecting regions could perhaps enhance the conversion, but this would have the disadvantage that a greater reactor volume would be required.

The principle of increasing the residence time of the hydrogen gas in the sulphur melt is also accomplished in DE 10 2008 040 544 A1 by a reactor having a bed of random ceramic packings in the sulphur melt. This reactor achieves a conversion of >99%. However, this reactor design requires constant hydrogen supply, since, in the event of a decline or shutdown in the hydrogen supply, the reaction gas can escape completely from the region of the random packing bed, and the random packing bed can become filled with liquid sulphur. Such a reactor can therefore be operated only within a very narrow load range.

A further means of enhancing the reaction rate is the use of catalysts, for example oxides or sulphides of cobalt, nickel or molybdenum. This approach is disclosed, for example, in U.S. Pat. No. 2,863,725 and EP 2 125 612 B1 in the form of reactors having catalyst-filled tubes which dip into the sulphur melt, and the gaseous reactants flow through them. However, disadvantages of these reactors are found to be that they are operated at a pressure of <5 bar, and that, as a result of the fact that the reaction of sulphur and hydrogen is predominantly catalytic, a large amount of catalyst is required.

It is therefore an object of the present invention to provide a reactor for preparation of hydrogen sulphide from sulphur and hydrogen, which ensures a hydrogen conversion of >99% and a high purity of the hydrogen sulphide produced. The reactor should also enable the preparation of hydrogen sulphide at a pressure of >5 bar, have a very compact design and ensure a very wide load range. Especially in an integrated production system, a very wide load range is advantageous, in order to be able to react flexibly to variations in load, rather than having to dispose of excess amounts which are not required by the integrated system at that moment but result from inflexibility. Finally, the reactor, from the point of view of costs, maintenance and safety, should be less prone to corrosion damage under the intended operating conditions. With regard to the energy which is required for provision of the sulphur melt and for dissipation of the heat of reaction, a particularly efficient reactor design is additionally desired. In addition, minimization of the amount of catalyst required and maximization of the catalyst service life is desirable.

To achieve this object, the present invention provides a reactor suitable for continuous preparation of hydrogen sulphide by exothermic reaction of sulphur and hydrogen to form a final product gas mixture $P_{final}$ comprising hydrogen sulphide and sulphur at elevated temperature and elevated pressure relative to standard conditions, said reactor comprising a lower reactor region suitable for accommodating a sulphur melt, one or more non-pressure-bearing first cavern(s) and at least one supply device suitable for controlled supply of pressurized gaseous hydrogen per first cavern, said caverns being suitable for at least temporary accommodation of a product gas mixture $P_1$ which forms in exothermic reaction and comprises hydrogen sulphide, sulphur and hydrogen, and a gas collecting region suitable for accommodating the product gas mixture $P_{final}$ at elevated temperature and elevated pressure relative to standard conditions.

The reactor additionally comprises one or more non-pressure-bearing installed device(s) suitable for continuous transfer of the total amount of product gas mixture $P_u$ formed in the lower reactor region to the gas collecting region and, in the case that a catalyst is present in the installed device(s), suitable for reaction of sulphur and hydrogen still present in the product gas mixture to hydrogen sulphide.

The reactor comprises an outer, pressure-bearing vessel. The reactor preferably has the shape of an upright cylinder closed by a hood at each of the two ends. A reactor according to the invention has a volume of preferably 0.5 to 200 m³. The reactor according to the invention also has one or more supply devices suitable for supply of liquid sulphur.

The supply devices for introduction of hydrogen are preferably at the lower end of the reactor, such that the gaseous reactants flow through the reactor along the longitudinal axis thereof. The hydrogen introduced into the sulphur melt is saturated with gaseous sulphur and is accommodated by one or more first cavern(s). In the gas space of the one or more first cavern(s), hydrogen and sulphur are reacted in exothermic reaction to hydrogen sulphide, forming the product gas mixture $P_1$ comprising hydrogen, sulphur and hydrogen sulphide. The cavern(s) is/are preferably surrounded by the sulphur melt, such that the heat of reaction released in the cavern(s) is dissipated into the sulphur melt.

In an alternative embodiment, the supply devices for introduction of hydrogen are designed such that the hydrogen can be introduced directly into the gas space of the one or more first caverns without previously being saturated with sulphur. The reactor may be constructed such that it has several supply devices, some of which introduce hydrogen into the sulphur melt and others introduce hydrogen directly into the gas space of the one or more first caverns. This mode of construction allows the relative hydrogen concentration, i.e. the ratio of the hydrogen and sulphur reactants, in the one or more first caverns to be controlled. In addition, this mode of construction can increase the amount of hydrogen and sulphur which gets into the possible second or higher caverns described below.

A "cavern" in the context of this invention is understood to mean any structural device that can accommodate and hold a gas volume. A cavern may take the form, for example, of a hood-shaped installed device under which a particular gas volume can collect and flow over the outer edges of the hood shape, which is open in the downward direction, to higher reactor regions.

In a further illustrative embodiment, a cavern may be formed by beds of hollow bodies or random packings at different levels. For example, these hollow bodies or random packings may take the form of beds on screens or screen boxes. Suitable hollow bodies or random packings are, for example, straight or curved hollow cylinders, hollow spheres, deformed hollow spheres, bell-shaped bodies, saddle-shaped bodies, screw-shaped bodies or other three-dimensional bodies with indentations and/or openings. In order to enable the penetration of the gas into the cavities of the hollow bodies or random packings, the hollow bodies and random packings preferably have orifices in their outer wall and/or are manufactured from porous material. A bed of the hollow bodies and random packings according to the invention preferably has a useful porosity (open porosity) $\phi_{open}$ of more than 0.32, more preferably more than 0.40, most preferably more than 0.6.

Figure 3:
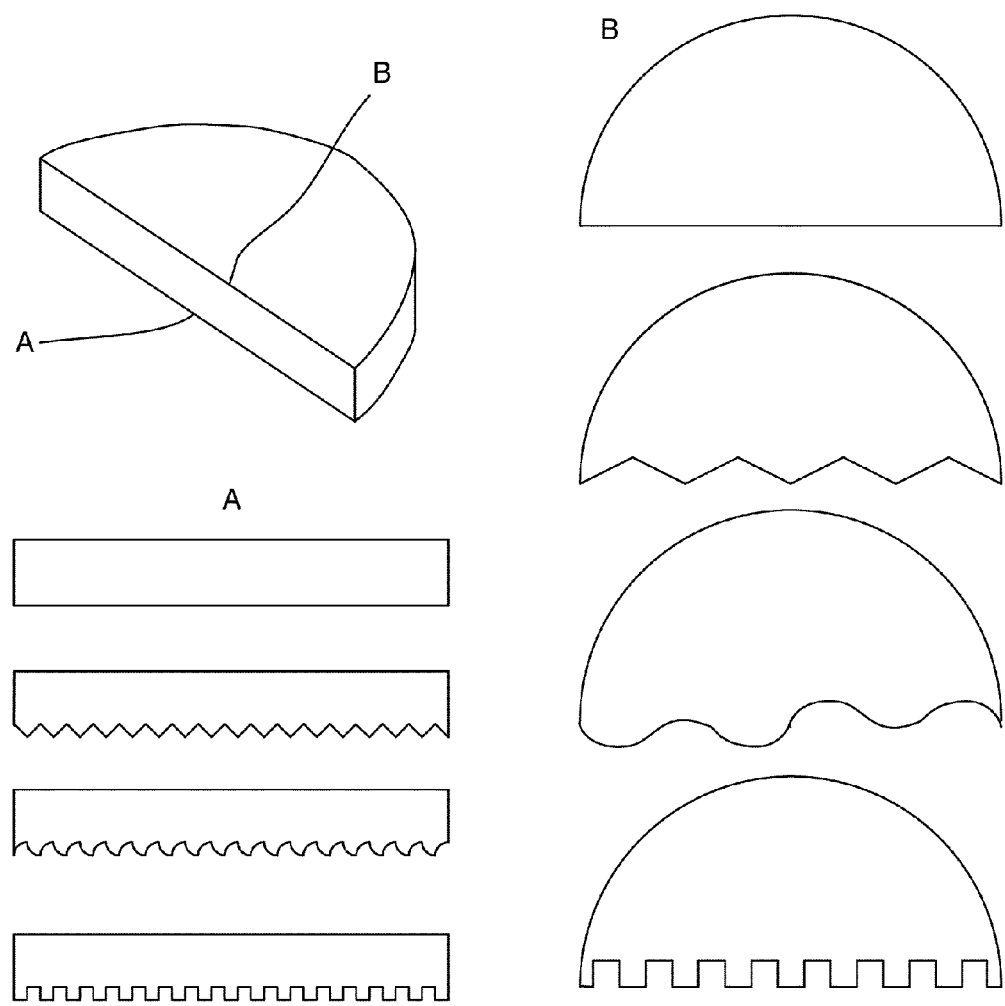
FIG. 3 shows a schematic of illustrative embodiments of caverns. The caverns shown have an intermediate tray with a weir running along the edge thereof. Various embodiments are shown for the lower edge of the weir A and the profile of the weir B.

In a preferred embodiment, a cavern consists of a horizontal intermediate tray having one or more orifices through which the gas can flow into higher reactor regions. Along the edges of the orifices, the intermediate tray has weirs running vertically downward, which retain a certain gas volume in the cavern. FIG. 3 shows some illustrative embodiments of caverns useable in accordance with the invention.

The use of caverns in the form of hood-shaped installed devices or in the form of the above-described horizontal intermediate trays is generally preferable to the use of caverns in the form of beds of hollow bodies or random packings. A disadvantage of hollow bodies or random packings may be that deposits of reaction by-products may occur over prolonged reactor run time under particular conditions, which could block the hollow bodies or random packings. The use of caverns in the form of hood-shaped installed devices or in the form of horizontal intermediate trays is suitable for avoiding this potential disadvantage and may therefore contribute to an extension of the reactor service life. Moreover, this cavern design facilitates the adjustment of the residence time of the gaseous reactants in the caverns, since parameters such as the ratio of height to width of the cavern volume, for example, are easier to calculate and to alter.

A further advantage of this cavern design is that the reaction gas itself, in the event of reduced hydrogen supply, does not completely escape from the caverns, and that a reduction in the hydrogen supply leads to an extension of the residence time. This residence time extension is suitable for compensating for a decrease in the reaction temperature owing to lower hydrogen supply and thus enabling a constantly high conversion. Caverns in the form of hood-shaped installed devices or in the form of intermediate trays therefore considerably widen the acceptable load range of the reactor.

The load range of the reactor may thus be within a range from 0 to 4000 $m^3$ (STP) ($H_2$)/($m^3$ (cavern volume)·h). The cavern volume relates in each case to a cavern through which gas flows.

The "first cavern" in the context of this invention refers to a cavern if the gas mixture which is collected in the cavern in question has not already flowed through other caverns beforehand.

The reactor may be designed such that it contains at least two non-pressure-bearing first caverns, every first cavern comprising at least one supply device suitable for controlled supply of pressurized gaseous hydrogen. The first caverns are suitable for at least temporary accommodation of the product gas mixture $P_1$ which forms. This enables, for example, a reduction in hydrogen sulphide production by shutting down the hydrogen supply to one or more first caverns. The reaction in the first cavern(s) remaining may continue at constant hydrogen concentration and hence under constant reaction conditions. Alternatively, with constant total amount of hydrogen introduced, the hydrogen load can be distributed between several caverns or concentrated in individual caverns in order to influence the reaction conditions in the first caverns in a controlled manner.

In a preferred embodiment, the reactor comprises, in addition to the at least one first cavern, one or more non-pressure-bearing second cavern(s) which are arranged above the first cavern(s) and are suitable for at least temporary accommodation of the product gas mixture $P_1$ formed in the first cavern(s) and for formation of further hydrogen sulphide by exothermic reaction of sulphur and hydrogen to form a product gas mixture $P_2$.

A "second cavern" in the context of this invention refers to a cavern when at least a portion of the gas mixture which is collected in the cavern in question has flowed through at least one first cavern immediately beforehand.

One or more of the second caverns may comprise at least one supply device suitable for controlled supply of pressurized gaseous hydrogen. In this way, gaseous hydrogen can be introduced not just into the first caverns but also into the second caverns in question, in order, for example, to increase the hydrogen concentration in $P_2$ and hence the reaction rate in the second caverns in question. The supply devices may—as in the case of the first cavern—be constructed such that the hydrogen can be introduced either into the sulphur melt below the second caverns or directly into the gas space of the second caverns.

In particular embodiments, the reactor may additionally comprise one or more non-pressure-bearing third, and optionally further, correspondingly suitable caverns arranged above the second cavern(s).

"Third (fourth, fifth, etc.) cavern" in the context of this invention refers to a cavern when at least a portion of the gas mixture which is collected in the cavern in question has flowed through at least one second (third, fourth, etc.) cavern immediately beforehand.

In order to enhance the hydrogen conversion in the second and higher caverns, it may be advantageous to extend the residence time of the hydrogen-containing gas mixture or to minimize the heat loss of the caverns in question. For this purpose, the reactor may be designed such that at least one of the second or higher caverns has a greater volume than each of the first caverns, and/or such that at least one of the second or higher caverns has lower heat removal for construction reasons than each of the first caverns. This is because it has been found that, in the course of operation of the reactor, more than 60% of the hydrogen can already be converted in the first cavern(s). The aforementioned measures can then achieve the effect that the hydrogen conversion rises to more than 80% or even more than 90% with the second cavern(s). The high hydrogen conversion achieved thereby in the region of the first and second caverns particularly avoids the effect that the reaction proceeds in the gas space above the sulphur melt, resulting in overheating of the gas space above the sulphur melt.

The lower heat removal from a cavern for construction reasons can be achieved, for example, through use of a material with lower thermal conductivity. The cavern in question may either be manufactured from this material or at least parts of its surface may be lined with this material. The lining may form a gas slot which additionally reduces heat transfer. Lower heat removal from individual caverns can alternatively also be achieved by use of a material with greater material thickness.

If a gas slot is used as an insulator, the cavern may be lined with aluminium or an aluminium alloy in order to increase the corrosion resistance of the cavern material.

In a further preferred embodiment, lower heat removal from individual caverns is achieved by use of a cavern geometry which hinders heat removal. For example, heat removal can be reduced by a lower ratio of cavern surface area to cavern volume.

In a preferred embodiment, the first caverns have a ratio of surface to volume of 1.5 to 30 $m^{-1}$, preferably of 3 to 9 $m^{-1}$, more preferably of 4 to 6 $m^{-1}$, and/or a ratio of height to width of 0.02 to 5, preferably of 0.05 to 1, more preferably of 0.08 to 0.12, and/or a ratio of weir length to throughput of 0.1 to 10 $m*h/t_{H2s}$, preferably of 0.2 to 1.8 $m*h/t_{H2s}$, more preferably of 1.0 to 1.2 $m*h/t_{H2s}$. In a further preferred embodiment, at least one of the second caverns has a ratio of surface to volume of 1.5 to 30 $m^{-1}$, preferably of 2.8 to 9 $m^{-1}$, more preferably of 3 to 5 $m^{-1}$, and/or a ratio of height to width of 0.02 to 5, preferably of 0.05 to 2, more preferably of 0.1 to 1, and/or a ratio of weir length to throughput of 0.1 to 10 $m*h/t_{H2s}$, preferably of 0.15 to 1.8 $m*h/t_{H2s}$, more preferably of 0.2 to 1.1 $m*h/t_{H2s}$.

During reactor operation, the product gas mixture $P_u$ collects above the sulphur melt and passes from there through one or more non-pressure-bearing installed devices into the gas collecting region of the reactor. In a preferred embodiment of the reactor, the gas collecting region is arranged above the lower reactor region. In alternative embodiments the gas collecting region may, for example, also be arranged below the lower reactor region, within the lower reactor region or at the side of the lower reactor region.

The one or more installed device(s) preferably take the form of U-shaped tubes. The reactor may comprise several identical or similarly constructed tubes for transfer of the product gas mixture. The U-shaped tubes are typically arranged horizontally in the reactor, with each of the two ends pointing upward. If the gas collecting region is arranged above the lower reactor region, the tubes may be connected to an intermediate tray which divides the lower reactor region from the gas collecting region, such that the ends of each of the tubes project into the gas collecting region, while the U-shaped parts of the tubes are within the lower reactor region. The limbs of the individual tubes may also be of different lengths, such that the ends of the shorter legs are within the lower reactor region and the ends of the longer legs project into the gas collecting region.

In an alternative embodiment of the reactor, the one or more installed device(s) take the form of straight, vertical tubes. The straight tubes are preferably arranged such that they, if the lower reactor region contains a sulphur melt, dip into the sulphur melt and connect the gas space above the sulphur melt to the gas collecting region arranged within or below the lower reactor region.

The tubes preferably have a diameter of 20 to 3000 mm, preferably of 60 to 150 mm, more preferably of 80 to 120 mm. Through orifices which may be provided, for example, in the side wall of a tube or, in the case of U-shaped tubes with limbs of unequal length, at the end of the shorter limb, the product gas mixture $P_u$ passes from the lower reactor region into the tubes. The orifices are preferably arranged at a distance of 0.1 to 3 m, preferably of 0.4 to 1.4 m, above the phase boundary of the sulphur melt, in order to prevent introduction of liquid sulphur into the tubes. The product gas mixture flows along the tubes and passes through orifices mounted, for example, at the end of the tubes into the gas collecting region.

The one or more installed device(s) preferably contain a heterogeneous catalyst for further conversion of hydrogen and sulphur present in the product gas $P_u$ to hydrogen sulphide. Typically, a cobalt- and molybdenum-containing catalyst is used. This is preferably a sulphur-resistant hydrogenation catalyst which preferably consists of a support, for example silica, alumina, zirconia or titania, and comprises one or more of the active metals molybdenum, nickel, tungsten, iron, vanadium, cobalt, sulphur, selenium, phosphorus, arsenic, antimony and bismuth. Particular preference is given to a mixed compound composed of CoO, $MoO_3$, $Al_2O_3$ with or without sulphate in tablet form. The catalyst is preferably positioned in the form of a fixed bed. In that case, the heterogeneous catalyst takes the form of pellets, tablets or comparable shaped bodies. However, other designs are also possible, for example honeycombs or a fluidized bed. The catalyst may likewise be present in the installed devices as a coating on random packings, monoliths or knits.

The amount of catalyst positioned in the installed devices is guided by the amount of residual hydrogen to be converted, the dimensions of the installed devices, the type of catalyst and possibly further factors. In the case of a catalyst bed, the amount of catalyst used, depending on the amount of hydrogen supplied, should be such that the hydrogen load does not exceed a value of 4000 $m^3$ (STP) $(H_2)/(m^3$ (catalyst bed volume)·h).

In addition, further catalysts may be provided at one or more sites in the reaction vessel. In this case, the catalyst is preferably positioned such that it does not come into contact with the liquid sulphur. This catalyst may be in the form of pellet beds, of suspended powder in the liquid sulphur, or of a coating on random packings, monoliths or knits. If further catalyst is used, this catalyst may be provided in the internals acting as caverns. In a further embodiment, this catalyst may be provided above the liquid sulphur and all caverns.

In a preferred embodiment of the invention, one, more than one or all of the installed devices for transfer of the product gas mixture $P_u$ from the lower reactor region to the gas collecting region are arranged in terms of construction such that, after sufficient filling of the lower reactor region with a sulphur melt, they are in thermal contact with the sulphur melt such that, if the installed device contains a catalyst, the catalyst is cooled by transfer of heat to the sulphur melt. In the case of the above-described U-shaped or straight tubes, these are preferably designed such that the outer shell area, in the region of the tube filled with catalyst, is surrounded by the sulphur melt to an extent of more than 20%, preferably to an extent of more than 50%, more preferably to an extent of more than 75%.

In order to ensure substantially homogeneous temperature distribution within the reactor, the reactor preferably comprises an inner wall which, in the course of operation of the reactor, with involvement of the space between outer reactor wall and the inner wall, allows continuous circulation of the sulphur melt according to the airlift pump principle. Sulphur flows here, driven by the introduction of hydrogen from the base, upward within the reactor region surrounded by the inner wall, and flows to the base within the space between outer reactor wall and the inner wall. The sulphur flowing downward can be cooled by removal of heat via the outer reactor wall. In a preferred embodiment, the cooling of the sulphur flowing downward is supported by heat exchangers provided, for example, on the outer reactor wall or in the space between outer reactor wall and inner wall.

In a preferred embodiment, the reactor comprises a reflux condenser suitable for condensation of the sulphur present in the product gas mixture $P_{final}$. The reflux condenser is preferably arranged above the gas collecting region. The reflux condenser is connected to the gas collecting region via an input line suitable for transport of the product gas mixture $P_{final}$ from the gas collecting region to the reflux condenser, and has a return line suitable for return of the condensed sulphur to the reactor, preferably to the lower reactor region. The return of the condensed sulphur also serves to cool the sulphur melt and thus contributes to maintenance of a constant temperature of the sulphur melt.

Even in the course of long operation for several years or decades, the reactor according to the invention has to be maintained or repaired only infrequently. The construction according to the invention avoids the occurrence of excess temperatures in pressure-bearing parts and thus increases plant safety, because reduced corrosion in this region minimizes the risk of material failure and the probability of accidents resulting from the escape of hazardous substances, for example hydrogen sulphide. The low inspection, maintenance and repair demands lower the costs and improve availability.

The present invention also provides a process for preparing hydrogen sulphide by exothermic reaction of sulphur with hydrogen at elevated temperature and elevated pressure relative to standard conditions to form a product gas mixture $P_{final}$ comprising hydrogen sulphide and sulphur, said process comprising the following steps:

providing a sulphur melt in a lower reactor region of a pressurized reactor, supplying pressurized hydrogen into the sulphur melt, the hydrogen supplied being accommodated at least partly, together with sulphur converted from the sulphur melt to the gaseous state, by at least one non-pressure-bearing first cavern, at least temporarily leaving the hydrogen and the sulphur in the first cavern, so as to form, in exothermic reaction, a product gas mixture $P_1$ comprising hydrogen sulphide, sulphur and hydrogen, and continuously transferring the total amount of the product gas mixture $P_u$ formed in the lower reactor region to a gas collecting region by means of one or more non-pressure-bearing installed device(s), wherein by use of a catalyst in the installed device(s) the sulphur and hydrogen present in the product gas mixture $P_u$ are reacted to form further hydrogen sulphide.

The process is preferably performed in the inventive reactor already described.

Rather than pure hydrogen, it is also possible to pass contaminated hydrogen through the sulphur melt. The impurities may, for example, be carbon dioxide, hydrogen sulphide, water, methanol, methane, ethane, propane or other volatile hydrocarbons. Preference is given to using hydrogen having a purity greater than 65% based on the gas volume. The impurities in the hydrogen or reaction products thereof are preferably not removed before the synthesis of methyl mercaptan, but left in the reactant mixture. The sulphur used may also contain different impurities.

The pressure and volume of the hydrogen supplied are guided by the pressure at which the reactor is operated and by the volume of hydrogen required. The amount of sulphur used is virtually stoichiometric to the amount of hydrogen used. Spent sulphur is replenished during the process.

In a preferred embodiment of the process, the product gas mixture $P_1$ is accommodated in at least one second cavern and is left at least temporarily therein, so as to react the sulphur and hydrogen present in the product gas mixture $P_1$ with formation of further hydrogen sulphide to give a product gas mixture $P_2$.

In a further embodiment of the process, at least a portion of the hydrogen supplied into the sulphur melt is accommodated directly by at least one of the second caverns. "Directly" is understood here to mean that the hydrogen supplied is not accommodated by a first cavern before passing into a second cavern. The hydrogen supply can thus be controlled with the aim of influencing the reaction rate in the first and second caverns in different ways.

The process can be performed in such a way that the product gas mixture is accommodated and left at least temporarily in at least one third or higher cavern, so as to react the sulphur and hydrogen present in the product gas mixture $P_2$ with formation of further hydrogen sulphide.

In an alternative embodiment of the process, at least some of the hydrogen is supplied at least to the first and/or higher caverns such that it does not come into contact with the sulphur melt beforehand. This can increase the hydrogen concentration in the caverns in question without also simultaneously transferring additional sulphur to the gas space of the cavern.

The supply of hydrogen into the liquid sulphur below a cavern (for example a second cavern) firstly has the effect that the hydrogen supplied to this cavern is increased, and secondly that sulphur is also transferred from the liquid sulphur to the gas space of this cavern.

The process is preferably performed such that the heat of reaction released by the reaction of sulphur and hydrogen is released into the sulphur melt as completely as possible. This includes the heat of reaction released over the catalyst. Preferably, heat transfer of the heat of reaction, released by the reaction of sulphur and hydrogen in the catalyst, to the sulphur melt thus cools the catalyst.

The process is preferably performed in such a way that the proportion of hydrogen sulphide in the product gas mixture $P_u$ prior to introduction into the installed device(s) containing the catalyst is at least 60%, preferably at least 90%, of the gas volume. The process conditions required for this purpose are described below. This has the advantage that the low proportion of hydrogen in the region of the catalyst prevents overheating of the catalyst and thus increases the service life of the catalyst.

The process preferably comprises an additional process step in which the sulphur present in the product gas mixture $P_{final}$ is condensed and recycled directly into the reactor, preferably to the lower reactor region. As a result there is the advantageous effect that cooling of the sulphur melt takes place as a function of the amount of hydrogen sulphide produced. More particularly, at the moment at which the temperature of the sulphur melt rises, there is likewise an increase in the hydrogen conversion, sulphur vaporization and sulphur reflux, such that overheating of the sulphur melt is counteracted. The sulphur condensation is preferably effected at a temperature of 120 to 150° C.

The process according to the invention can typically be performed at a pressure of 1 to 30 bar, preferably at 5 to 15 bar, more preferably 7 to 12 bar. The temperature of the sulphur melt is typically 300 to 600° C., preferably 380 to 480° C., more preferably 400 to 450° C. Hydrogen conversions of 99.9% are thus easily achievable. Hydrogen conversions in the region of 99.93% have likewise been observed.

The process according to the invention enables the production of hydrogen sulphide having a purity of more than 99.8% by volume. A purity of up to 99.85% by volume has likewise been found. In this case, the product gas mixture, after condensation of sulphur present, may contain between 0.05 and 0.15% by volume of hydrogen, 10 to 30 ppm of sulphur and 400 to 600 ppm of sulphanes.

Sulphanes in the context of this invention refer to hydrogen polysulphides according to the empirical formula $H_2S_x$ where x is typically an integer from 2 to 10. The abovementioned sulphur concentrations are already enabled by sulphur condensation within the abovementioned temperature range. Freezing at temperatures below 120° C.—as known from other $H_2S$ processes—is not required for this purpose.

The present invention also relates to the use of a reactor according to the invention for preparation of hydrogen sulphide having a sulphane content not exceeding 600 ppm, preferably not exceeding 400 ppm, more preferably not exceeding 200 ppm.

The present invention is further described by the following examples:

1. Reactor (1) suitable for continuous preparation of hydrogen sulphide by exothermic reaction of sulphur and hydrogen to form a final product gas mixture $P_{final}$ comprising hydrogen sulphide and sulphur at elevated temperature and elevated pressure relative to standard conditions, said reactor (1) comprising
    a lower reactor region (2) suitable for accommodating a sulphur melt (3),
    one or more non-pressure-bearing first cavern(s) (4) and at least one supply device (5, 5a) suitable for controlled supply of pressurized gaseous hydrogen per first cavern, said caverns (4) being suitable for at least temporary accommodation of a product gas mixture $P_1$ which forms in exothermic reaction and comprises hydrogen sulphide, sulphur and hydrogen, and
    a gas collecting region (6) suitable for accommodating the product gas mixture P final at elevated temperature and elevated pressure relative to standard conditions,
    characterized in that the reactor (1) additionally comprises one or more non-pressure-bearing installed device(s) (7) suitable for continuous transfer of the total amount of product gas mixture $P_u$ formed in the lower reactor region (2) to the gas collecting region (6) and, in the case that a catalyst is present in the installed device(s) (7), suitable for reaction of sulphur and hydrogen still present in the product gas mixture $P_u$ to hydrogen sulphide.
2. Reactor according to Example 1, characterized in that the reactor (1) comprises at least two non-pressure-bearing first caverns (4) and at least one supply device (5, 5a) suitable for controlled supply of pressurized gaseous hydrogen per first cavern (4), said first caverns (4) being suitable for at least temporary accommodation of the product gas mixture $P_1$ which forms.
3. Reactor according to Example 1 or 2, characterized in that the reactor (1) additionally comprises one or more non-pressure bearing second cavern(s) (8) which are arranged above the first cavern(s) (4) and are suitable for at least temporary accommodation of the product gas mixture $P_1$ formed in the first cavern(s) (4) and for formation of further hydrogen sulphide by exothermic reaction of sulphur and hydrogen to form a product gas mixture $P_2$.
4. Reactor according to Example 3, characterized in that at least one of the second caverns (8) comprises at least one supply device (9, 9a) suitable for controlled supply of pressurized gaseous hydrogen.
5. Reactor according to Example 3 or 4, characterized in that the reactor (1) additionally comprises one or more non-pressure-bearing third (10), and optionally further, correspondingly suitable caverns arranged above the second cavern(s) (8).
6. Reactor according to any one of Examples 3 to 5, characterized in that at least one of the second or higher caverns (8, 10) has a greater volume than each of the first caverns (4), and/or in that at least one of the second or higher caverns (8, 10) has lower heat removal for construction reasons than each of the first caverns (4).
7. Reactor according to any one of Examples 1 to 6, characterized in that one, more than one or all of the installed devices (7) for transfer of the product gas mixture $P_u$ from the lower reactor region (2) to the gas collecting region (6) are arranged in terms of construction such that, after sufficient filling of the lower reactor region (2) with a sulphur melt (3), they are in thermal contact with the sulphur melt (3) such that, if the installed device (7) contains a catalyst, the catalyst is cooled by transfer of heat to the sulphur melt (3).
8. Reactor according to any one of Examples 1 to 7, characterized in that the reactor comprises an inner wall (11) which, in the course of operation of the reactor with involvement of the space between outer reactor wall and the inner wall (11), allows continuous circulation of the sulphur melt according to the airlift pump principle.
9. Reactor according to any one of Examples 1 to 8, characterized in that the reactor additionally comprises a reflux condenser suitable for condensation of the sulphur present in the product gas mixture $P_{final}$, an input line suitable for transport of the product gas mixture $P_{final}$ from the gas collecting region to the reflux condenser and a return line suitable for return of the condensed sulphur to the reactor.

10. Process for preparing hydrogen sulphide by exothermic reaction of sulphur with hydrogen at elevated temperature and elevated pressure relative to standard conditions to form a product gas mixture $P_{final}$ comprising hydrogen sulphide and sulphur, said process comprising the following steps:

providing a sulphur melt in a lower reactor region of a pressurized reactor, supplying pressurized hydrogen into the sulphur melt, the hydrogen supplied being accommodated at least partly, together with sulphur converted from the sulphur melt to the gaseous state, by at least one non-pressure-bearing first cavern, at least temporarily leaving the hydrogen and the sulphur in the first cavern(s), so as to form, in exothermic reaction, a product gas mixture $P_1$ comprising hydrogen sulphide, sulphur and hydrogen, and continuously transferring the total amount of the product gas mixture $P_u$ formed in the lower reactor region to a gas collecting region by means of one or more non-pressure-bearing installed device(s), wherein by use of a catalyst in the installed device(s) the sulphur and hydrogen present in the product gas mixture $P_u$ are reacted to form further hydrogen sulphide.

11. Process according to Example 10, characterized in that the product gas mixture $P_1$ is accommodated in one or more second cavern(s) and is left at least temporarily therein, so as to react the sulphur and hydrogen present in the product gas mixture $P_1$ with formation of further hydrogen sulphide to give a product gas mixture $P_2$.

12. Process according to Example 11, characterized in that at least a portion of the hydrogen supplied into the sulphur melt is accommodated directly by one or more second cavern(s).

13. Process according to Example 11 or 12, characterized in that the product gas mixture is accommodated and left at least temporarily in one or more third or higher cavern(s), so as to react the sulphur and hydrogen present in the product gas mixture $P_2$ with formation of further hydrogen sulphide.

14. Process according to any one of Examples 10 to 13, characterized in that the catalyst is cooled by heat transfer of the heat of reaction, released by the reaction of sulphur and hydrogen in the catalyst, to the sulphur melt.

15. Process according to any one of Examples 10 to 14, characterized in that the proportion of hydrogen sulphide in the product gas mixture $P_u$ prior to introduction into the installed device(s) containing the catalyst is at least 60% of the gas volume.

16. Process according to any one of Examples 10 to 15, characterized in that it comprises an additional process step in which the sulphur present in the product gas mixture $P_{final}$ is condensed and recycled directly into the reactor.

17. Process according to any one of Examples 10 to 16, characterized in that the preparation of hydrogen sulphide is performed at a pressure of 5 to 15 bar.

18. Process according to any one of Examples 10 to 17, characterized in that the temperature of the sulphur melt is 400 to 450° C.

19. Process according to any one of Examples 10 to 18, characterized in that the sulphur melt is circulated continuously according to the airlift pump principle.

20. Use of a reactor according to any one of Examples 1 to 9 for preparation of hydrogen sulphide having a sulphane content not exceeding 600 ppm.

Figure 1:
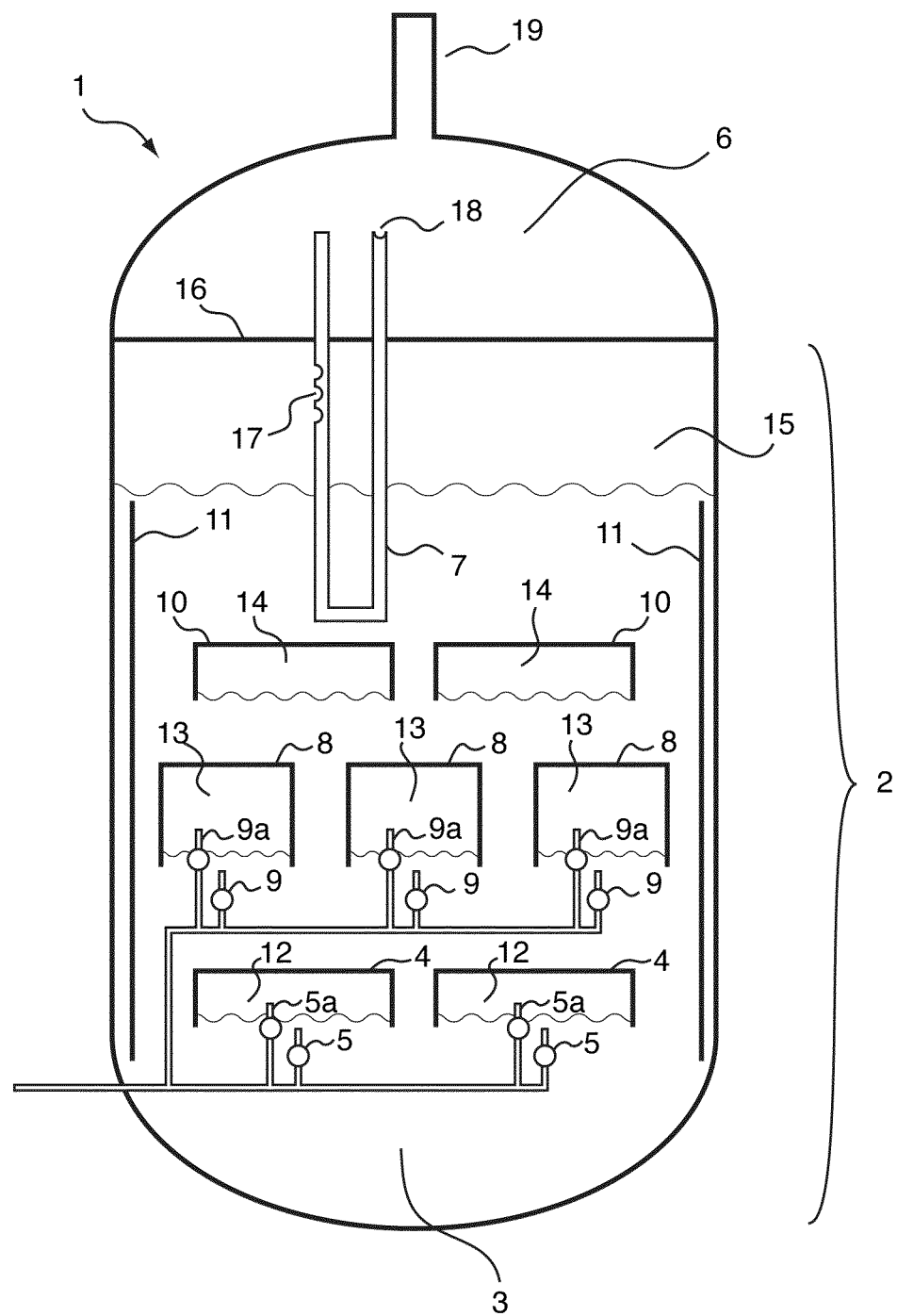
FIG. 1 shows, by way of example and schematically, a reactor which can be used in accordance with the invention for preparation of hydrogen sulphide from hydrogen and sulphur.

FIG. 1 shows, by way of example and schematically, a reactor which can be used in accordance with the invention for preparation of hydrogen sulphide from hydrogen and sulphur.

The reactor 1, shown in FIG. 1, comprises an outer, pressure-bearing vessel containing a sulphur melt 3 in the lower region 2 thereof. By means of supply devices 5, hydrogen can be introduced into the sulphur melt, and is accommodated directly by the first caverns 4. Supply devices 5a can also be used to introduce hydrogen directly into the gas space 12 of the first caverns 4. In the gas space 12 of the first caverns 4, the product gas mixture $P_1$ comprising hydrogen, sulphur and hydrogen sulphide is formed. The reactor shown also has additional supply devices 9, by means of which hydrogen can be supplied directly to the second caverns 8, wherein the product gas mixture $P_2$ forms in the gas space 13. By means of supply devices 9a, hydrogen can also be introduced directly into the gas space 13 of the second caverns 8. The gas mixture flowing upward is temporarily accommodated by the third caverns 10, wherein the product gas mixture $P_3$ forms in the gas space 14. In the gas space 15, the entire product gas mixture $P_u$ formed in the lower reactor region collects. The gas space 15 is separated from the gas collecting region 6 by an intermediate tray 16. The product gas mixture $P_u$ is transferred from the gas space 15 to the gas collecting region 6 using the installed device 7. The installed device 7 is designed as a U-shaped tube which dips into the sulphur melt 3. Via orifices 17 and 18, gas can flow into and out of the installed device 7. The installed device 7 can accommodate a catalyst which enables the further conversion of sulphur and hydrogen in the product gas mixture $P_u$ to form the product gas mixture $P_{final}$. The product gas mixture $P_{final}$ comprising sulphur and hydrogen sulphide is accommodated in the gas collecting region 6 and can be withdrawn from the reactor via the orifice 19, or optionally supplied to a reflux condenser. In the region of the sulphur melt, the reactor also comprises an inner wall 11 which serves for continuous circulation of the sulphur melt by the airlift pump principle.

Figure 2:
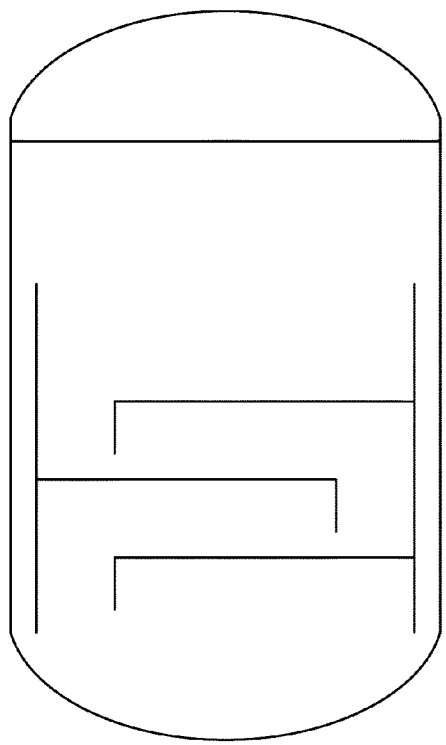
FIG. 2 shows a schematic of four different illustrative cavern arrangements in the case of a reactor with first, second and third caverns.
Figure 2:
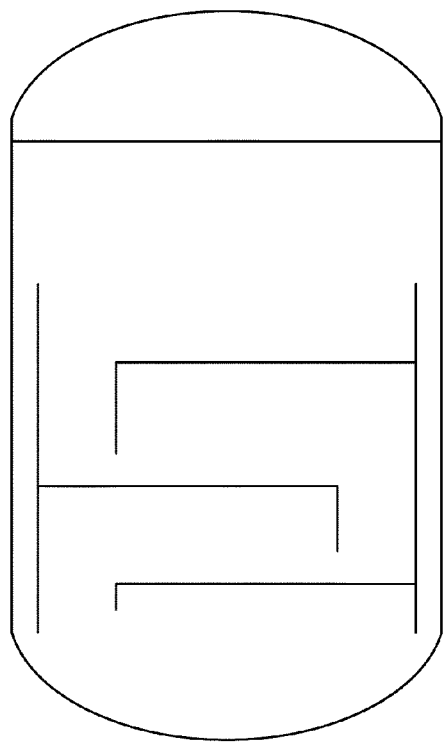
Figure 2:
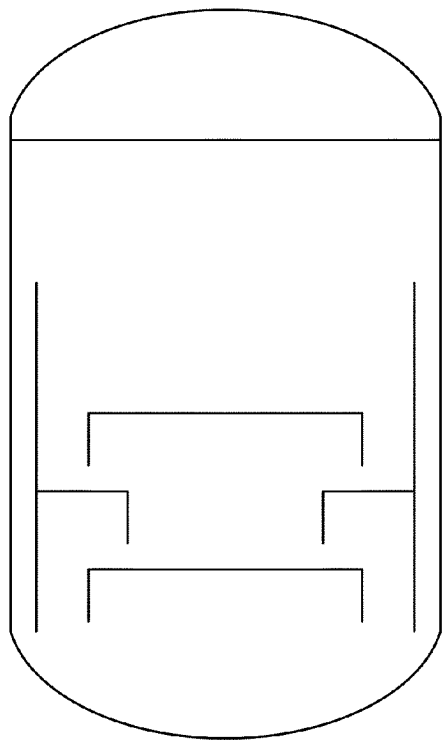
Figure 2:
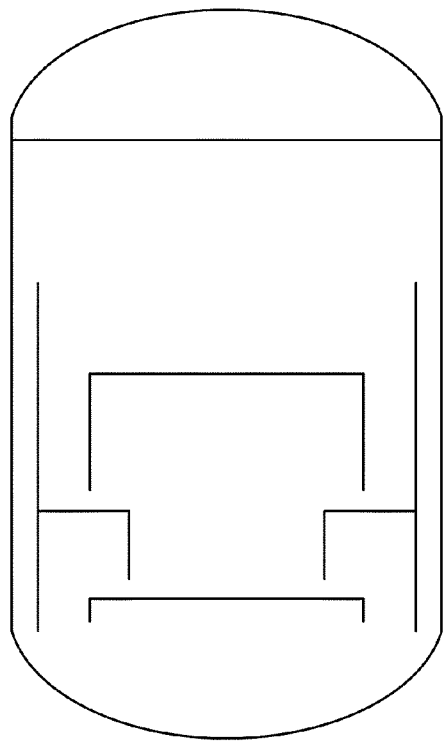

FIG. 2 shows a schematic of four different illustrative cavern arrangements in the case of a reactor with first, second and third caverns. The caverns consist of intermediate trays each having one orifice. The orifices are each arranged such that the gas mixture must flow from the first to the second and from the second to the third cavern. Top left is a reactor according to the invention with a first, second and third cavern in each case. The three caverns each have the same geometry. Top right is a reactor according to the invention with a first, second and third cavern in each case, with continuously increasing weir height and hence increasing residence time of the gas mixture from the first to the third cavern. Bottom left is a reactor according to the invention with a first, second and third cavern in each case, all caverns having the same weir height. The second cavern has a circular orifice in the middle of the intermediate tray. Bottom right is a reactor according to the invention with a first, second and third cavern in each case, with continuously increasing weir height and hence increasing residence time of the gas mixture from the first to the third cavern.

FIG. 3 shows a schematic of illustrative embodiments of caverns. The caverns shown have an intermediate tray with a weir running along the edge thereof. Various embodiments are shown for the lower edge of the weir A and the profile of the weir B.

EXAMPLES

Example 1

Comparative Example 1000 l (STP)/h of hydrogen were introduced continuously via a frit at the base into a tube having an internal diameter of 5 cm which had been filled with liquid sulphur up to a height of 1 m. The consumption of sulphur was compensated for by further metered addition of liquid sulphur, while keeping the fill level constant. Sulphur removed from the product gas stream by condensation was recycled into the upper region of the tube in liquid form. Above the liquid sulphur, jacketed thermocouples for temperature measurement were provided at intervals of 10 cm. While the reactor was heated to 400° C. electrically via the outer wall, a homogeneous temperature of about 397° C. was present within the sulphur. However, the thermocouples above the sulphur showed a maximum temperature of 520° C. In addition, above the liquid sulphur, new material samples made from standard stainless steel (1.4571) were provided at the location of maximum temperature. After an operating time of about 400 h, the material samples were removed and showed severe corrosion phenomena in the form of flaking and weight loss.

Example 2

Comparative Example

Example 1 was repeated, except that the height of the liquid sulphur was raised to 4 m. The value of the maximum temperature above the liquid sulphur was maintained. Severe corrosion phenomena likewise occurred on the material samples.

Example 3

Comparative Example

Example 2 was repeated, except that 15% by weight of a pulverulent $Co_3O_4MoO_3/Al_2O_3$ catalyst were suspended in liquid sulphur. The value of the maximum temperature above the liquid sulphur was maintained. Severe corrosion phenomena likewise occurred on the material samples.

Example 4

The process according to the invention was examined in a pilot plant. The pilot reactor had a height of approx. 5.5 m, a diameter of approx. 0.5 m and a volume of approx. 0.8 m³. The pilot plant was equipped with four caverns of equal dimensions in series. 70 m³ (STP)/h of hydrogen were metered in continuously via the hydrogen feeds, which corresponded to a hydrogen load of 3700 m³ (STP)($H_2$)/(m³ (cavern volume)·h) based on the single cavern. Spent sulphur was replenished under fill level control. Sulphur removed from the product gas stream by condensation was recycled into the reactor in liquid form. The pressure in the reactor was 12 bar. The temperature in the liquid sulphur was 430° C. The residence time in the caverns was 5 s in each case. The $H_2$ conversion through homogeneous reaction in the caverns was about 90%. By means of thermocouples installed in a fixed manner in the reactor, the temperature within the caverns and above the sulphur melt was measured. The highest temperature measured in the caverns under these circumstances was 479° C. Above the liquid sulphur phase, no commencement of a homogeneous reaction was discernible. The gas temperature above the liquid sulphur corresponded virtually to the temperature of the liquid sulphur, such that there were no increased demands on the material of the pressure-bearing jacket in the region of the gas phase above the liquid sulphur.

The gas phase then flowed to and through the catalyst in the installed device, as shown schematically in FIG. 1 (7). The hydrogen remaining was then converted virtually completely over the catalyst (overall conversion of $H_2$: 99.86 mol %). The gas hourly space velocity on the catalyst was 3700 m³ (STP)($H_2$)/(m³ (bed volume of catalyst)·h). There was virtually no occurrence of corrosion in the form of flaking or weight loss on the material used. Material samples made from standard stainless steel (1.4571) which were installed for comparative purposes had only moderate corrosion attack.

LIST OF REFERENCE NUMERALS (1) Reactor
(2) Lower reactor region
(3) Sulphur melt
(4) First caverns
(5, 5a) Hydrogen supply device to the first caverns
(6) Gas collecting region
(7) Installed device for transfer of gas from the lower reactor region to the gas collecting region, optionally containing a catalyst
(8) Second caverns
(9, 9a) Hydrogen supply device to the second caverns
(10) Third caverns
(11) Inner wall
(12) Gas space of the first caverns
(13) Gas space of the second caverns
(14) Gas space of the third caverns
(15) Gas space of the lower reactor region
(16) Intermediate tray
(17) Orifice
(18) Orifice
(19) Orifice

The invention claimed is:
1. A reactor suitable for continuous preparation of hydrogen sulphide by an exothermic reaction of sulphur and hydrogen to form a final product gas mixture $P_{final}$ comprising rising hydrogen sulphide and sulphur at an elevated temperature and an elevated pressure relative to standard conditions, said reactor comprising:
  a lower reactor region suitable for accommodating a sulphur melt,
  a non-pressure-bearing first cavern and a supply device which is accommodated directly into the first caverns suitable for controlled supply of pressurized gaseous hydrogen to the non-pressure-bearing first cavern, said cavern being suitable for at least temporary accommodation of a product gas mixture $P_1$ which forms in the exothermic reaction and comprises hydrogen sulphide, sulphur and hydrogen, and a gas collecting region suitable for accommodating the product gas mixture $P_{final}$ at an elevated temperature and an elevated pressure relative to standard conditions, wherein an installed non-pressure-bearing device is suitable for continuous transfer of the total amount of a product gas mixture $P_u$ formed in the lower reactor region to the gas collecting region, wherein said non-pressure-bearing installed device comprises a heterogeneous catalyst for further conversion of hydrogen and sulphur present in the product gas $P_u$ to hydrogen sulphide, wherein the reactor does not contain a frit for the supply of pressurized hydrogen.

2. The reactor according to claim 1, wherein the reactor comprises at least two non-pressure-bearing first caverns and a supply device suitable for controlled supply of pressurized gaseous hydrogen to the non-pressure-bearing first caverns, said first caverns being suitable for at least temporary accommodation of the product gas mixture $P_1$.

3. The reactor according to claim 1, wherein the reactor further comprises at least one non-pressure bearing second cavern which is arranged above the non-pressure bearing first cavern and is suitable for at least temporary accommodation of the product gas mixture $P_1$ formed in the non-pressure bearing first cavern and for formation of further hydrogen sulphide by the exothermic reaction of sulphur and hydrogen to form a product gas mixture $P_2$.

4. The reactor according to claim 3, wherein at least one of the non-pressure bearing second caverns comprises a supply device suitable for controlled supply of pressurized gaseous hydrogen.

5. The reactor according to claim 3, wherein the reactor further comprises a non-pressure-bearing third cavern, and, optionally, correspondingly suitable caverns arranged above the non-pressure bearing second cavern.

6. The reactor according to claim 5, wherein at least one of the second or higher non-pressure bearing caverns has a greater volume than each of the non-pressure bearing first caverns, and/or wherein at least one of the non-pressure bearing second or third caverns has lower heat removal than each of the non-pressure bearing first caverns.

7. The reactor according to claim 3, wherein at least one of the installed devices for transfer of the product gas mixture $P_u$ from the lower reactor region to the gas collecting region are arranged such that after sufficient filling of the lower reactor region with the sulphur melt the installed device is in thermal contact with the sulphur melt such that the catalyst is cooled by transfer of heat to the sulphur melt.

8. The reactor according to claim 1, wherein the reactor comprises an inner wall, wherein the reactor has a space between an outer reactor wall and the inner wall that allows continuous circulation of the sulphur melt according to the airlift pump principle.

9. The reactor according to claim 1, wherein the reactor further comprises:
a reflux condenser suitable for condensation of sulphur present in the product gas mixture $P_{final}$,
an input line suitable for transport of the product gas mixture $P_{final}$ from the gas collecting region to the reflux condenser, and
a return line suitable for return of condensed sulphur to the reactor.

10. A process for preparing hydrogen sulphide by an exothermic reaction of sulphur with hydrogen at an elevated temperature and an elevated pressure relative to standard conditions to form a product gas mixture $P_{final}$ comprising hydrogen sulphide and sulphur, said process comprising:
providing a sulphur melt in a lower reactor region of a pressurized reactor,
supplying pressurized hydrogen into the sulphur melt through a supply device which is accommodated directly into the first caverns, the hydrogen supplied being accommodated at least partly, together with sulphur converted from the sulphur melt to the gaseous state, by at least one non-pressure-bearing first cavern,
at least temporarily leaving the hydrogen and the sulphur in the non-pressure-bearing first cavern, so as to form, in the exothermic reaction, a product gas mixture $P_1$ comprising hydrogen sulphide, sulphur and hydrogen, and
continuously transferring the total amount of the product gas mixture $P_u$ formed in the lower reactor region to a gas collecting region by one or more installed non-pressure-bearing devices, wherein in the presence of a catalyst in the installed non-pressure-bearing devices sulphur and hydrogen present in the product gas mixture $P_u$ are reacted to form further hydrogen sulphide, wherein the reactor does not contain a frit for the supply of pressurized hydrogen.

11. The process according to claim 10, wherein the product gas mixture $P_1$ is accommodated in one or more non-pressure-bearing second caverns and is left at least temporarily therein, so as to react sulphur and hydrogen present in the product gas mixture $P_1$ with formation of further hydrogen sulphide to give a product gas mixture $P_2$.

12. The process according to claim 11, wherein at least a portion of the hydrogen supplied into the sulphur melt is accommodated directly by one or more non-pressure-bearing second caverns.

13. The process according to claim 11, wherein the product gas mixture is accommodated and left at least temporarily in one or more non-pressure-bearing third or higher caverns, so as to react sulphur and hydrogen present in the product gas mixture $P_2$ with formation of further hydrogen sulphide.

14. The process according to claim 10, wherein the catalyst is cooled by heat transfer of the heat of reaction, released by the reaction of sulphur and hydrogen in the catalyst, to the sulphur melt.

15. The process according to claim 10, wherein a proportion of hydrogen sulphide in the product gas mixture $P_u$ prior to introduction into the one or more installed devices comprising the catalyst is at least 60% of the gas volume.

16. The process according to claim 10, further comprising condensing the sulphur present in the product gas mixture $P_{final}$ and recycling the condensed sulphur directly into the reactor.

17. The process according to claim 10, wherein the hydrogen sulphide is prepared at a pressure of 5 to 15 bar.

18. The process according to claim 10, wherein the sulphur melt has a temperature of 400 to 450° C.

19. The process according to claim 10, wherein the sulphur melt is circulated continuously according to the airlift pump principle.

20. The reactor according to claim 1, wherein the hydrogen sulphide produced by the reactor comprises a sulphane content not exceeding 600 ppm.

* * * * *